US 12,330,576 B2

(12) United States Patent
Kobayashi et al.

(10) Patent No.: US 12,330,576 B2
(45) Date of Patent: Jun. 17, 2025

(54) AIRBAG DEVICE (71) Applicants: Yuto Kobayashi, Kanagawa (JP); Tsutomu Sakurai, Kanagawa (JP); Hiroyuki Shima, Kanagawa (JP)

(72) Inventors: Yuto Kobayashi, Kanagawa (JP); Tsutomu Sakurai, Kanagawa (JP); Hiroyuki Shima, Kanagawa (JP)

( * ) Notice: Subject to any disclaimer, the term of this patent is extended or adjusted under 35 U.S.C. 154(b) by 512 days.

(21) Appl. No.: 17/758,931

(22) PCT Filed: Jan. 12, 2021

(86) PCT No.: PCT/JP2021/000657
§ 371 (c)(1),
(2) Date: Jan. 27, 2023

(87) PCT Pub. No.: WO2021/149534
PCT Pub. Date: Jul. 29, 2021

(65) Prior Publication Data
US 2023/0192022 A1 Jun. 22, 2023

(30) Foreign Application Priority Data
Jan. 20, 2020 (JP) .................. 2020-006595

(51) Int. Cl.
B60R 21/207 (2006.01)
B60R 21/217 (2011.01)
B60R 21/231 (2011.01)

(52) U.S. Cl.
CPC ........ *B60R 21/207* (2013.01); *B60R 21/2176* (2013.01); *B60R 2021/23146* (2013.01)

(58) Field of Classification Search
CPC .............. B60R 21/207; B60R 21/2176; B60R 2021/23146
See application file for complete search history.

(56) References Cited

U.S. PATENT DOCUMENTS 9,205,797 B2 * 12/2015 Östman .................. B65B 61/24
10,384,636 B2 * 8/2019 Shimizu ............ B60R 21/23138
(Continued)

FOREIGN PATENT DOCUMENTS

EP 3663139 A1 * 6/2020 ........... B60R 21/201
JP 2001-58557 A 3/2001
(Continued)

OTHER PUBLICATIONS

Office Action received in corresponding Chinese Patent Application 202180007668.7, dated Mar. 31, 2023 with translation.

*Primary Examiner* — Jason D Shanske
*Assistant Examiner* — Joselynn Y Sliteris (57) ABSTRACT An airbag device is provided with a bag-shaped airbag cushion in a prescribed rolled or folded stowed form, and a cover member for covering an outer periphery of the airbag cushion in stowed form formed of a ductile fabric material containing a plurality of polymer fibers. The cover member has a hard portion in a state in which at least a portion of the plurality of polymer fibers are melted together, and a soft portion that bends more readily than the hard portion in which the percentage of the plurality of polymer fibers that are melted is at least lower than that of the hard portion. The airbag device is characterized by a state in which the cover member is bent along the soft portion, covering at least a portion of the outer periphery of the airbag cushion in stowed form.

14 Claims, 12 Drawing Sheets (56) References Cited

U.S. PATENT DOCUMENTS

| | | | | |
|---|---|---|---|---|
| 10,471,921 B2* | 11/2019 | Ydrén | ................ | B60R 21/2176 |
| 10,717,403 B2* | 7/2020 | Shimizu | ................ | B60R 21/201 |
| 10,829,074 B2* | 11/2020 | Jacobson | ........... | B60R 21/2338 |
| 10,967,826 B2* | 4/2021 | Henriksson | ........... | B60R 21/207 |
| 11,046,277 B2* | 6/2021 | Svensson | .............. | B60R 21/215 |
| 11,247,630 B2* | 2/2022 | Kobayashi | ............ | B60R 21/207 |
| 11,505,156 B2* | 11/2022 | Kabeya | ................ | B60R 21/201 |
| 11,938,884 B2* | 3/2024 | Ishikawa | ................ | B60R 21/207 |
| 2018/0050653 A1* | 2/2018 | Shimizu | ................ | B60R 21/237 |
| 2018/0111579 A1* | 4/2018 | Shimizu | ................ | B60R 21/201 |

FOREIGN PATENT DOCUMENTS

| | | |
|---|---|---|
| JP | 2001-158320 A | 6/2001 |
| JP | 2004-291887 A | 10/2004 |
| KR | 20190085065 A | 7/2019 |
| WO | 2016/167087 A1 | 10/2016 |
| WO | 2016/170892 A1 | 10/2016 |
| WO | 2019/087698 A1 | 5/2019 |

* cited by examiner

AIRBAG DEVICE

TECHNICAL FIELD

The present invention is related to an airbag device for restraining an occupant in an emergency.

BACKGROUND ART

Airbag devices have generally become standard equipment in vehicles in recent years. An airbag device is a safety device that is actuated in the event of an emergency such as a vehicle collision or the like to receive and protect an occupant by expanding and deploying a bag-shaped airbag cushion with gas pressure.

There are various types of airbag devices depending on the installation site and application. For example, a front airbag device is provided in a center of a steering wheel in order to protect a driver from a collision in a front-back direction. In addition, a curtain airbag device is provided in the vicinity of a ceiling above a side window, and a side airbag device is provided on a side part of a seat to protect an occupant from an impact in a vehicle width direction due to a side collision or the like.

An airbag cushion of a typical airbag device is stored in various sites of a vehicle in a wound or folded storing form. For example, Patent Document 1 describes technology related to a cover member 118 for enclosing an airbag 12 of a curtain airbag device disclosed by the applicant of the present application. The cover member 118 is formed of ductile cloth material containing a polymer fiber and in one portion is configured including a highly rigid part 25 having high rigidity.

PRIOR ART DOCUMENTS

Patent Documents

Patent Document 1: WO 2016/170892

SUMMARY OF THE INVENTION

Problem to be Solved by the Invention

Regarding current cover members for enclosing an airbag cushion, improved retention performance is required of airbag cushions in stowed form. If a stowed form of an airbag cushion could be more stably retained, ease of assembling the airbag cushion to the seat or the like would also improve.

In light of the problems described above, an object of the present invention is to provide an airbag device capable of efficiently retaining an airbag cushion in stowed form.

Means to Solve the Problem

In order to resolve the problems described above, a typical configuration of the airbag device according to the present invention is an airbag device including:
  a bag-shaped airbag cushion in a prescribed rolled or folded stowed form; and a cover member formed of a ductile cloth material containing a plurality of polymer fibers and that is for covering an outer periphery of the airbag cushion in stowed form; wherein
  the cover member has a hard portion in a state in which at least a portion of the plurality of polymer fibers are melted together, and a soft portion in which a ratio of the plurality of melted polymer fibers is lower than at least the hard portion and that bends more easily than the hard portion, and the
  cover member is bent along the soft portion and covers at least a portion of the outer periphery of the airbag cushion in stowed form.

With the configuration described above, the airbag cushion in stowed form can be efficiently retained by the cover member, which has the soft portion and the hard portion. Therefore, for example, assembly work in the vehicle and the like for the airbag cushion is simplified, and the airbag cushion being rolled or folded can be suitably retained even when vibration and the like is applied during travel.

The airbag device may be equipped in the vehicle seat as a side airbag of the vehicle, and the hard portion may be arranged so as to face a portion corresponding to an occupant side of the vehicle seat. According to this configuration, a side airbag device is achieved and the airbag cushion in stowed form can be suitably retained by arranging the hard portion in a portion in which load is readily received from the occupant.

A prescribed seat pad is packed into the vehicle seat described above, and the hard portion may be disposed so as to be flush with an occupant side of the seat pad. This configuration can protect against non-uniformities occurring when the occupant contacts the vehicle seat and enabling maintaining seating comfort of the vehicle seat.

The cover member described above may also further have a weak portion capable of being split open by airbag cushion expansion pressure formed in a prescribed location of the soft portion. Providing the weak portion allows the cover member to smoothly release the airbag cushion.

The weak portion described above may include a prescribed slit. This configuration allows the weak portion to smoothly split open.

The airbag cushion in stowed form described above may be equipped in a vehicle seat in a state connected from a side portion of a first side of a seatback of the vehicle seat, across an upper portion of a headrest of the vehicle seat to a side portion of a second side of the seatback, and in the cover member, the soft portion may be arranged in a position bent along a form of the seatback and the headrest in the airbag cushion in stowed state.

With the cover member in the configuration described above, rolls or folds thereof can be suitably retained even when the airbag cushion is equipped in the vehicle seat in a complex orientation.

The soft portion described above may be disposed at least near a boundary of a side portion and an upper portion of the seatback, near a boundary of the headrest and the seatback, and near a boundary of the side portion and an upper portion of the headrest. With this configuration, bending the cover member via the soft portion allows the airbag cushion to be suitably disposed on an inner portion of the headrest and the seatback.

The hard portion described above may be a plurality of polymer fibers in a compressed state. This configuration enables suitable forming of the hard portion.

Effect of the Invention

According to the present invention, an airbag device capable of efficiently retaining an airbag cushion in stowed form can be provided.

BRIEF DESCRIPTION OF THE DRAWINGS

FIG. 7 is a first modified example of the airbag device in FIG. 1 and the like.

FIG. 10 is a second modified example of the airbag device in FIG. 1 and the like.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1A:
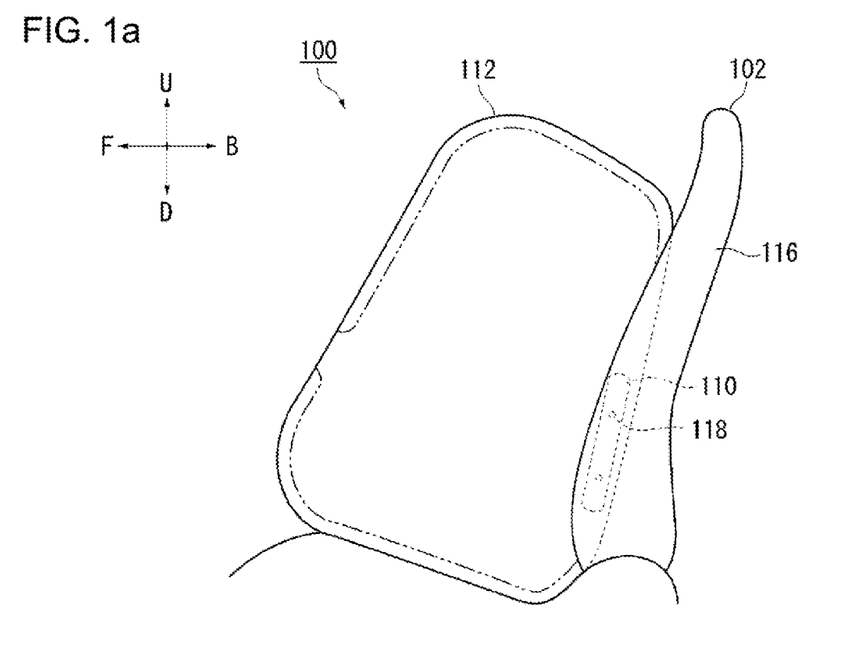
FIG. 1 is a diagram illustrating the airbag device according to an embodiment of the present invention.

FIG. 1 is a diagram illustrating an airbag device 100 according to an embodiment of the present invention. FIG. 1(a) illustrates the airbag cushion 112 in an activated state. The airbag apparatus 100 is equipped in a seat 102 for a vehicle as a side airbag of the vehicle. FIG. 1(a) illustrates, from the right side in the vehicle width direction, the airbag device 100 and the seat 102. Furthermore, the front-back direction with respect to the seat 102 is appropriately indicated by arrows F (Forward) and B (Back), respectively, the left-right is indicated by arrows L (Left) and R (Right), respectively, and the up-down direction is indicated by arrows U (Up) and D (Down), respectively.

In FIG. 1(a), the skin or seat pad (for example, urethane material) of the seatback 104 of the seat 102 is omitted, and only a frame 106 is illustrated. The frame 106 is a skeletal structure member equipped in the seatback 104. Note, the seat 102 is assumed to be arranged on the left side in the front row. However, the airbag device 100 can be provided in any seat, in the front row, in the back row, and can even be provided on either the left or right side of the vehicle. Furthermore, the seat 102 normally faces the front of the vehicle, but can also be assumed to rotate to face the rear. Therefore, the directions indicated by arrows in each diagram are not intended to be limited to the front-back and left-right directions relative to the vehicle, but rather the front direction is "front" and a back side direction is "back" as viewed from an occupant regularly seated in the seat 102. Similarly, a right hand direction of the occupant at this time is "right" and a left hand direction is "left". Furthermore, with regard to the center of the body of the occupant at this time, a direction toward the head is "up" and a direction toward the leg is "down."

The airbag device 100 uses the airbag cushion 112 to restrain an occupant seated on the seat 102 from the side in an emergency such as when an impact occurs on the vehicle. The airbag cushion 112 is a bag-shaped member for capturing an occupant and is formed by overlapping, stitching, and otherwise adhering a plurality of base materials included on the surface thereof or weaving using OPW (one piece woven).

An inflator 110 is a gas generating device that operates upon receiving an activation signal transmitted from the vehicle side when an impact occurs, and supplies gas to the inside of the airbag cushion 112. In the present embodiment, the inflator 110 used is a cylinder type. The inflator 110 is equipped on the rear side of the inside of the airbag cushion 112 with the longitudinal direction thereof facing up and down. A plurality of stud bolts 118 protrude from a main body of the inflator 110 (see FIG. 2(a) and the like), and the stud bolts 118 are secured by fastening the stud bolts 118 to a frame side plate part 116.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any of these types can be used for the inflator 110.

Figure 1B:
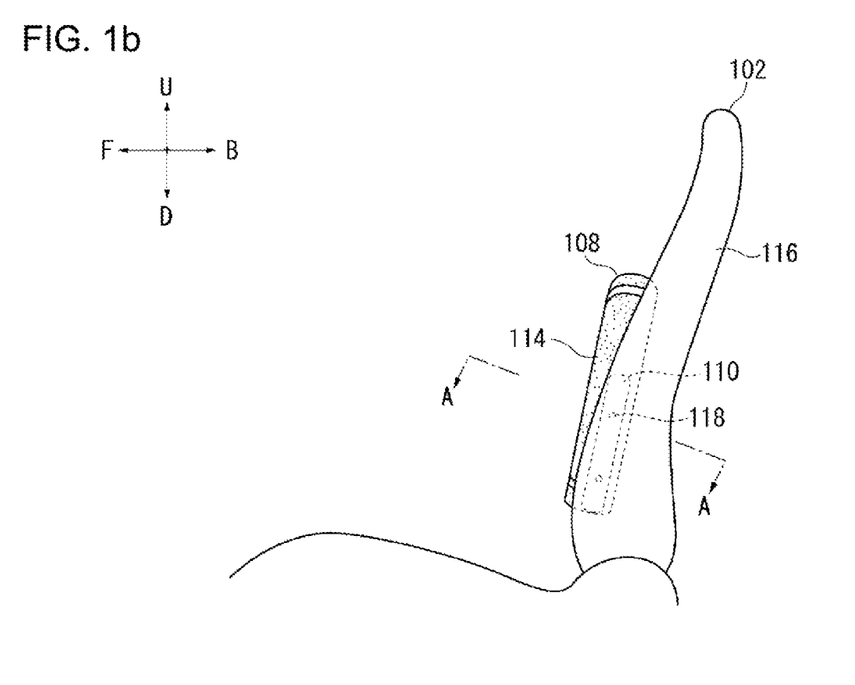

FIG. 1(b) is a diagram illustrating the state before activation of the airbag cushion 112 of FIG. 1(a). Prior to activation, the airbag cushion 112 (see FIG. 2(b)) is formed into a rolled, folded, or the like stowed form in a state in which the inflator 110 is inserted, then unitized as an airbag module 108 of which at least a portion or all of an outer periphery is covered by a cover member 114.

The airbag module 108 is assembled to the frame side plate part 116 of the frame 106. The frame side plate part 116 is located in the frame 106 along left and right side surfaces of the seatback 104. The frame side plate part 116 is provided in pairs on the left and right sides in the vehicle width direction. In the present embodiment, the airbag module 108 is assembled to the frame side plate part 116 on the left side in the vehicle width direction. Note that the airbag module 108 can also be assembled to the frame side plate part on the right side in the vehicle width direction. In other words, the airbag module 108 can be installed either on a side part on a door side (near side) of the seat 102 that is closer to a collision point, or on a side part on a vehicle inner side (far side) that is farther from the collision point.

The airbag module 108 includes the cover member 114 for covering the airbag cushion 112 in stowed form. The cover member 114 includes a ductile fabric material containing a plurality of polymer fibers, covers the outer periphery of the airbag cushion 112 in stowed form, breaks from an expansion pressure of the airbag cushion 112, and releases the airbag cushion 112.

Figure 2A:
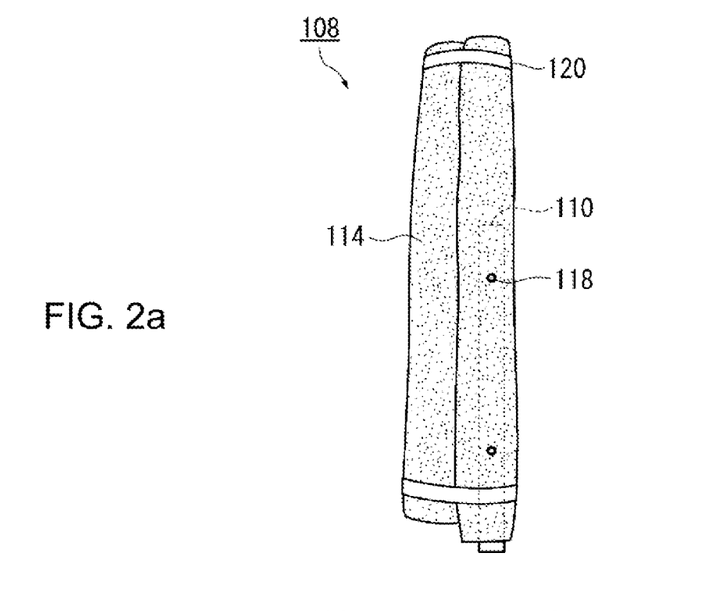
FIG. 2 is a diagram illustrating the airbag module in FIG. 1(b) by itself.

FIG. 2 is a diagram illustrating the airbag module 108 in FIG. 1(b) by itself. FIG. 2(a) illustrates the airbag module 108 in FIG. 1(b) viewed from the left side in the vehicle width direction. The cover member 114 is in a state engaged onto the stud bolts 118 of the inflator 110 extending from an inner side and fastened with tape 120 capable of breaking at two positions, which are upper and lower positions.

Figure 2B:
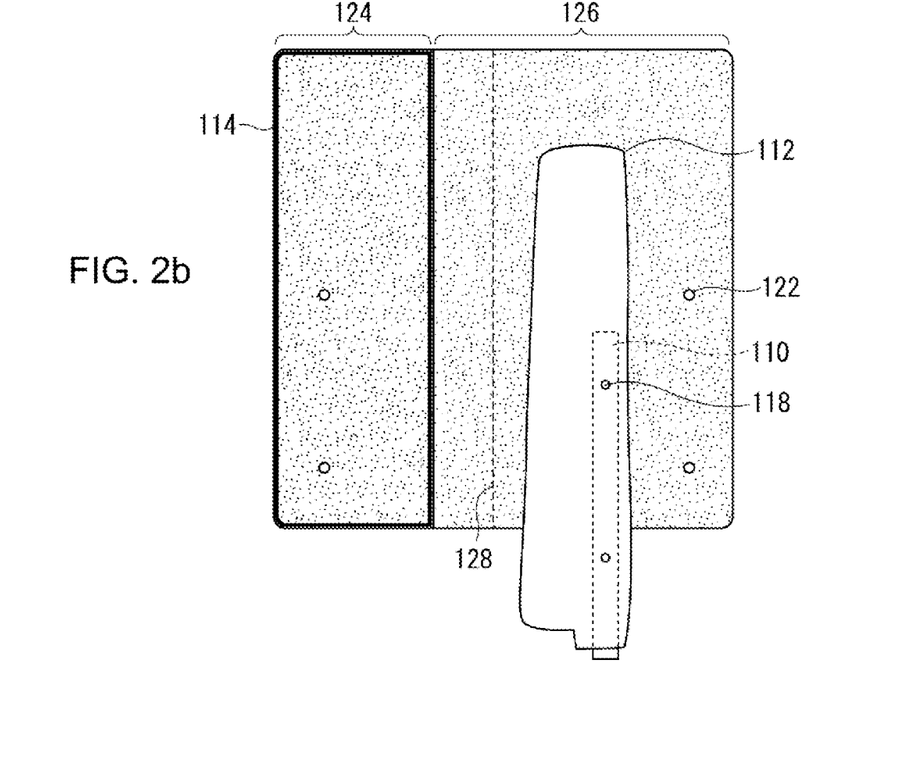

FIG. 2(b) is a diagram illustrating a state in which the cover member 114 in FIG. 2(a) is separated from the airbag cushion 112. FIG. 2(b) illustrates a state in which the cover member 114 is spread out flat. In order for the stud bolts 118 of the inflator 110 to pass through, the cover member 114 is provided with a bolt hole 122 at each location on the edges of both sides.

As described above, the cover member 114 is formed of a ductile fabric material containing a plurality of polymer fibers, and is implemented in the present embodiment as a felt-like non-woven fabric. Examples of the polymer fiber include polyester fiber. The polymer fiber may be a monocomponent fiber or may be a bicomponent composite fiber having a different core and coating. Bicomponent composite fibers are suitable when melting the fibers together if a melting point of the coating is set lower than a melting point of the core. Moreover, the ductile fabric material may also be formed containing a plurality of polymer fibers in which a plurality is different.

In the cover member 114 of the present embodiment, a hard portion 124 is formed in a portion, allowing a form in a state enclosing the airbag cushion 112 to be maintained. In the hard portion 124, the plurality of polymer fibers is compressed, making it hard and difficult to bend. A region outside of the hard portion 124 is a soft portion 126, which bends more easily than the hard portion 124.

The soft portion 126 of the cover member 114 is provided with a weak portion 128 that can be split open when the airbag cushion 112 inflates and deploys. The weak portion 128 can be achieved as, for example, a breaking line-shaped slit or the like formed transversely to the cover member 114. The weak portion 128 allows the cover member 114 to smoothly split open based on expansion pressure of the airbag cushion 112 and smoothly release the airbag cushion 112. Note that in addition to the breaking line-shaped slit, the weak portion 128 can also be achieved as a configuration of breaking lines arranged in an incision shape or an arrangement of small notches (through holes).

Figure 3A:
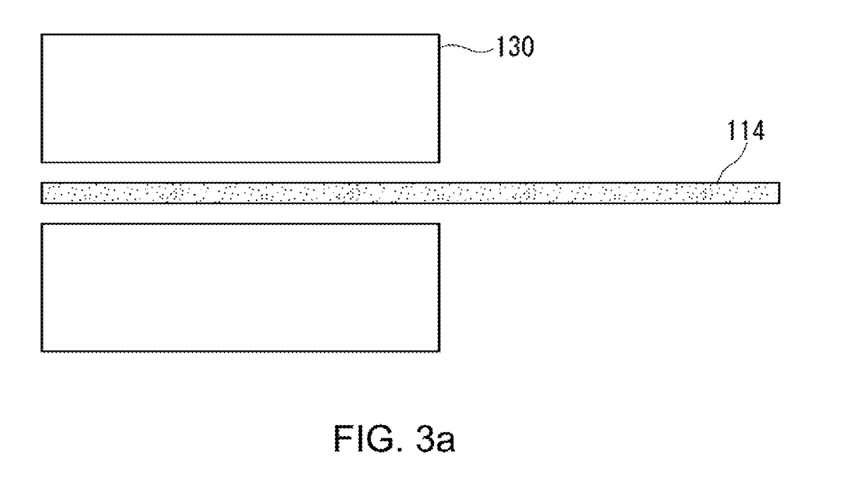
FIG. 3 is a diagram illustrating a process for forming the hard portion of the cover member in FIG. 2(b).

FIG. 3 is a diagram illustrating a process for forming the hard portion 124 of the cover member 114 in FIG. 2(b). FIG. 3(a) illustrates a process of applying press processing to the cover member 114. The hard portion 124 is formed by a die 130 pressing a prescribed area of the cover member 114.

Figure 3B:
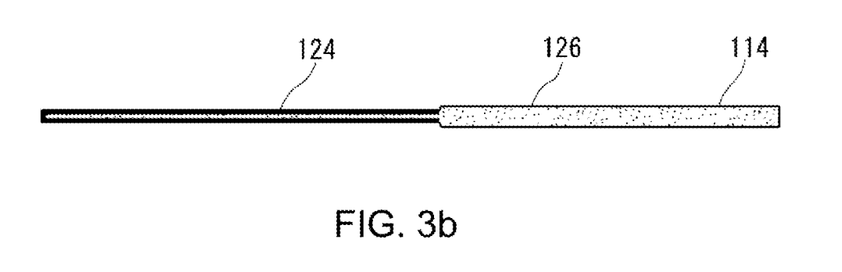

FIG. 3(b) is a state of the cover member 114 following the application of press processing in FIG. 3(a). The hard portion 124 is formed by compressing and fusing the plurality of polymer fibers in the cover member 114. The press processing is carried out, for example, on bicomponent composite fiber contained in the cover member 114 at a temperature higher than the melting point of the coating but lower than melting point of the core. In this manner, the bicomponent composite fiber fuses to other fibers. A hard portion 124 formed in this manner has a higher bending rigidity (second moment of area×young's modulus) than another region. Meanwhile, a region to which press processing is not applied forms the soft portion 126, which maintains the original softness thereof. In the soft portion 126, the plurality of polymer fibers is in a non-melted state, or at least in a state where the ratio of melting is lower than that of the hard portion 124.

Figure 4:
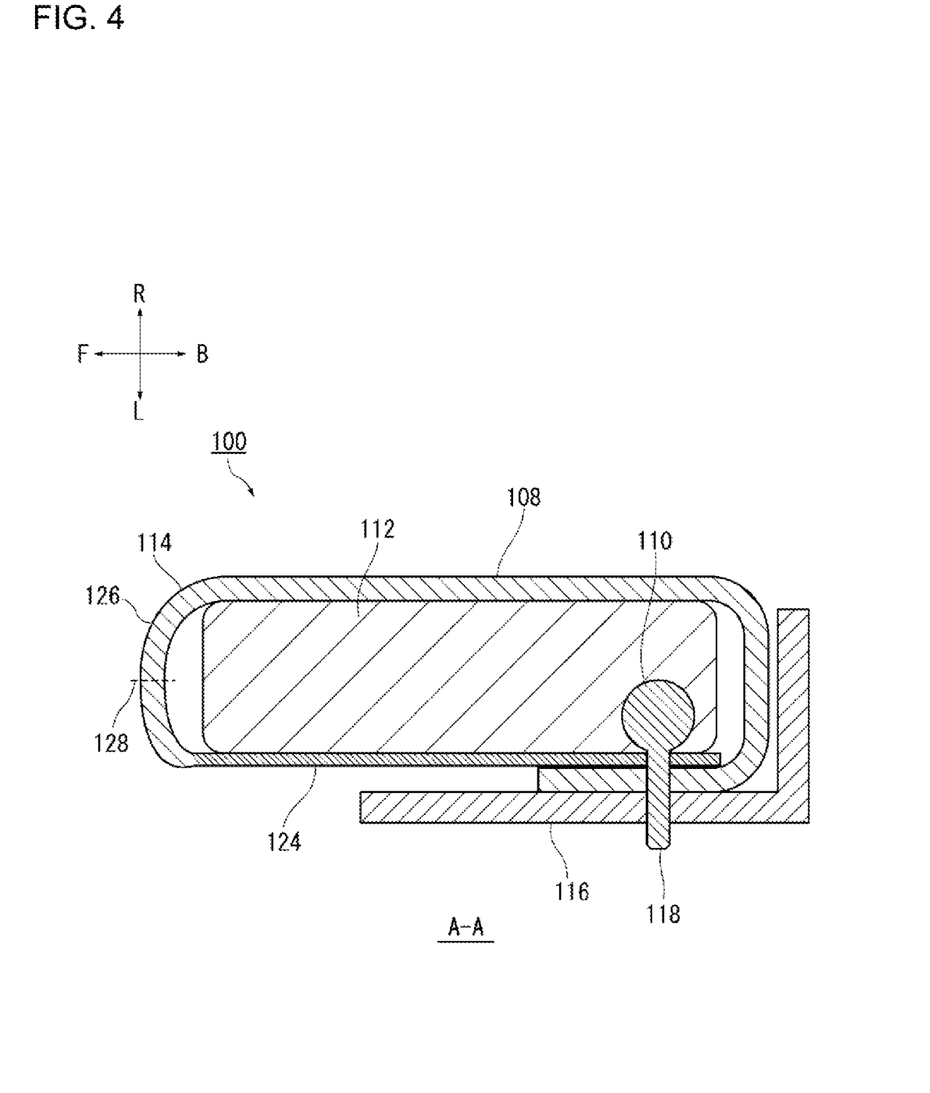
FIG. 4 is a cross-sectional view along A-A of the airbag device in FIG. 1(b).

FIG. 4 is a cross-sectional view along A-A of the airbag device 100 in FIG. 1(b). In the airbag module 108, the cover member 114 is in a state bent along the soft portion 126 and covering the outer periphery of the airbag cushion 112 in stowed form. The airbag module 108 is in a state in which a hard region of the cover member 114 is arranged on a side of the frame side plate part 116 and is secured to the frame side plate part 116 by the stud bolts 118 of the inflator 110.

In the state where the airbag module 108 is assembled to the frame side plate part 116, the weak portion 128 is formed within the soft portion 126 of the cover member 114 at a location positioned at the front of the airbag cushion 112 in stowed form.

When a vehicle sensor detects an impact, gas is supplied by the inflator 110. Due to the expansion pressure of the airbag cushion 112 at this time, the cover member 114 splits open at the weak portion 128 and releases the airbag cushion 112.

According to the present embodiment as described above, the airbag cushion 112 in stowed form can be efficiently retained by the cover member 114, which has the hard portion 124 and the soft portion 126. Therefore, the airbag module 108 can protect, via the cover member 114, against disorder in a roll or the like of the airbag cushion 112, which simplifies, for example, assembly work of the airbag cushion 112 onto the vehicle or the like. In addition, following vehicle assembly, the airbag module 108, via the cover member 114, can protect against other structures interfering with the airbag cushion 112, and the rolling or folding of the airbag cushion 112 can be suitably maintained even when vibration or the like is applied during travel.

In the present embodiment, the hard portion 124 is formed in the cover member 114 in advance, prior to enclosing the airbag cushion 112. As a result, an effect on an apparatus such as the inflator 110 is low and there is no risk of disorder in the roll or the like of the airbag cushion 112; this therefore being preferable to the case of applying processing to the cover member 114 after enclosing the airbag cushion 112.

Note that the weak portion 128 may be appropriately provided in a prescribed location of the soft portion 126, not just on the front side of the airbag cushion 112. In addition, if the hard portion 124 is also provided on a region other than the side of the frame side plate part 116, a weak portion 128 may also be provided in a prescribed location of the hard portion 124. Further, there is no restriction to a number of sheets of the ductile fabric material forming the cover member 114 and, for example, a plurality of a cloth-like ductile fabric material may be stacked and pressed to form a hard portion 124 having higher bending rigidity. This increases the bending rigidity of the hard portion 124, improves, via the cover member 114, retention performance of the airbag cushion 112, and an effect as a reaction force surface for expansion and deployment by the airbag cushion 112 can be obtained.

Note that the cover member 114 can also be formed by thermal welding together a plurality of an end material edge formed by the polymer fibers. In this case, the end material edges peel off due to the expansion pressure of the airbag cushion 112, which enables the edges to be used as the weak portion 128. Moreover, the cover member 114 is not limited to a non-woven fabric material and may also be formed by a woven fabric material. In other words, the cover member 114 may be a cloth having a material composition or a fiber structure that imparts mobility or elastic behavior to the fibers.

(Modified Example of Cover Member)

FIG. 5 is a diagram illustrating a first modified example (cover member 200) of the cover member 114 in FIG. 3. In the description below, the same code will be provided for configuration elements that have already been described and the description thereof omitted. In addition, configuration elements with the same name as configuration elements already described have the same configuration and function even if a different reference is applied.

Figure 5A:
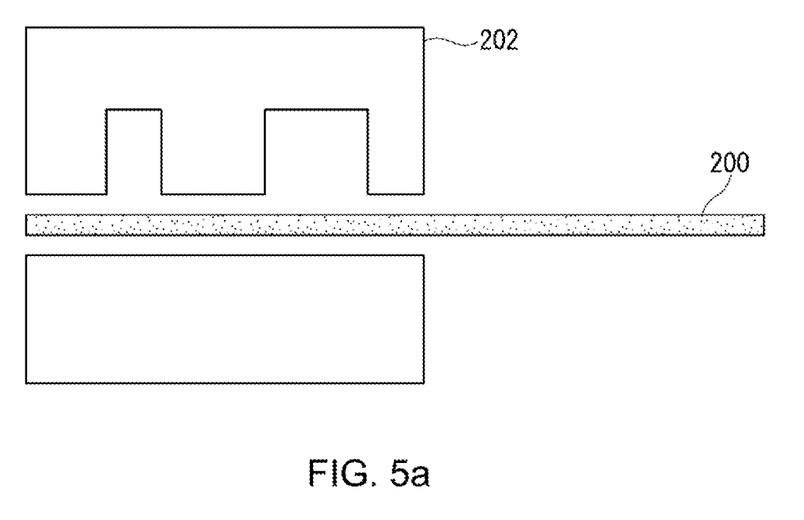
FIG. 5 is a diagram illustrating a first modified example of the cover member in FIG. 3.
Figure 5B:
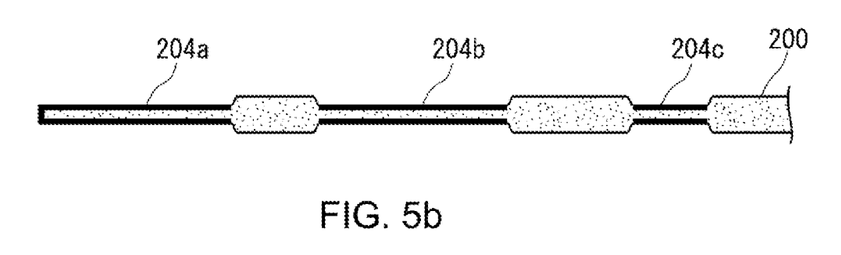

FIG. 5(a) corresponds to FIG. 3(a) and illustrates a process of applying press processing to the cover member 200. Changing from the die 130 (see FIG. 3(a)) to a die 202 for the press processing also allows hard portions 204*a* to 204*c* (see FIG. 5(*b*)) to be formed in a plurality of locations in the cover member 200.

FIG. 5(*b*) is a state of the cover member 200 following the application of press processing in FIG. 5(*a*). The hard portions 204*a* to 204*c* are formed in three separate regions in the cover member 200 by press processing using the die 202 described above.

Figure 6:
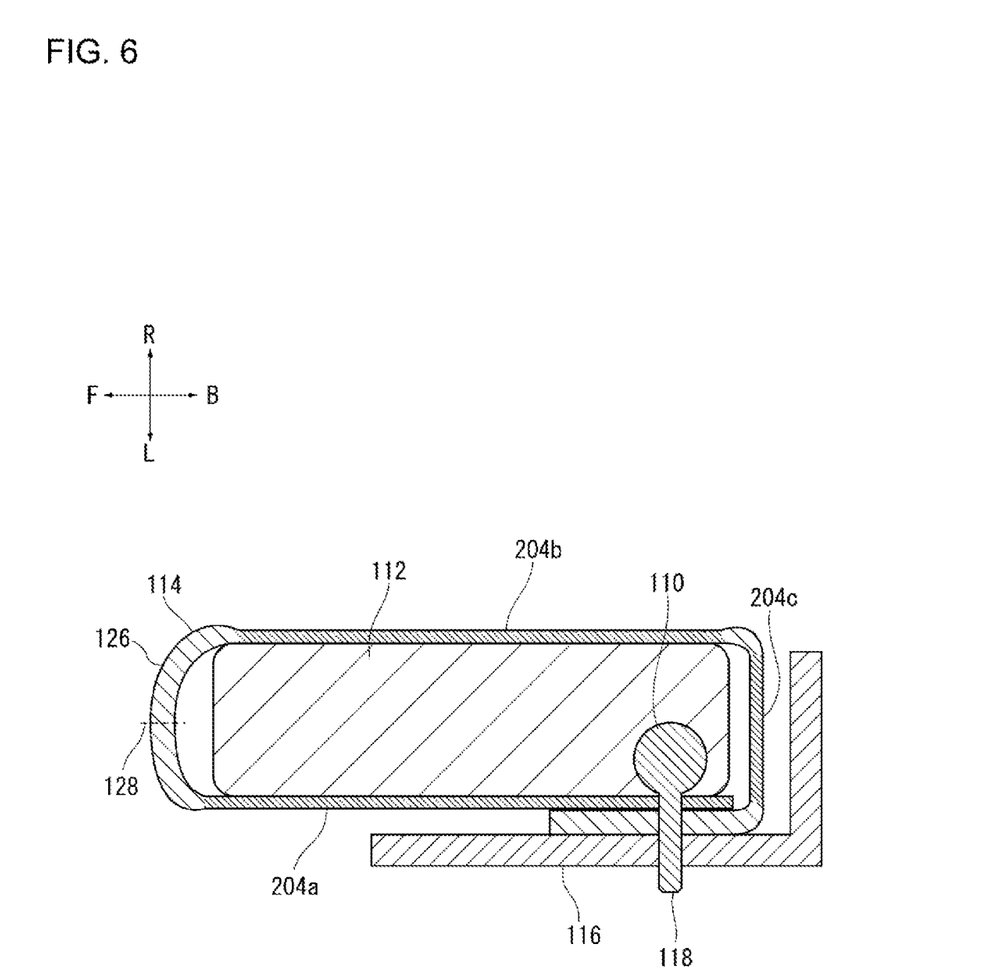
FIG. 6 is a cross-sectional view of the cover member in FIG. 5(b) illustrated corresponding to FIG. 4.

FIG. 6 is a cross-sectional view of the cover member 200 in FIG. 5(*b*) illustrated corresponding to FIG. 4. The cover member 200 protects, via the hard portions 204*a* to 204*c*, the frame side plate part 116 of the airbag cushion 112, an inner side of the airbag cushion 112 in the width direction and the side of the airbag cushion towards the rear of the vehicle. According to the cover member 200, the retention performance of the stowed form of the airbag cushion 112 can be improved and interference with other structures can be fully prevented.

(Modified Example of Airbag Device)

Figure 7A:
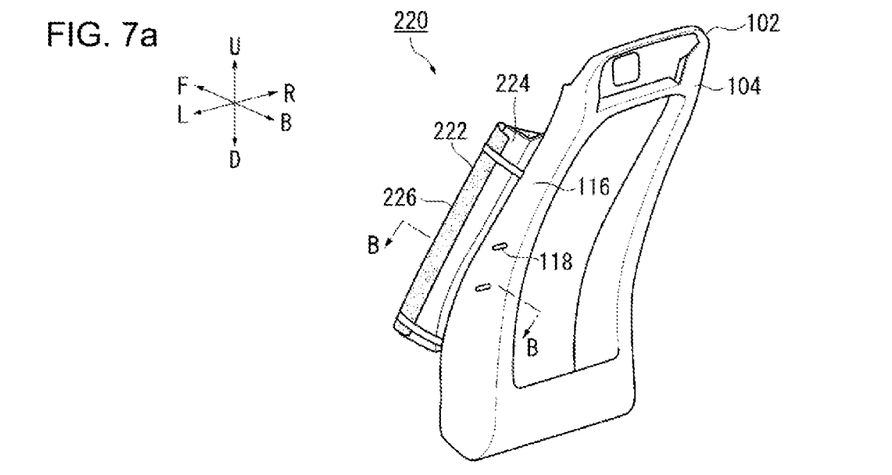

FIG. 7 is a first modified example of the airbag device 100 (airbag device 220) in FIG. 1 and the like. FIG. 7(*a*) is a perspective view of the airbag device 220 viewed from the left-and-rear side of the vehicle. The airbag device 220 is different from the airbag device 100 of FIG. 1(*b*) in that the airbag module 222 includes a bracket 224 in addition to the airbag cushion 112 (see FIG. 9) and the inflator 110.

The bracket 224 is a member made of resin having some level of rigidity that supports the airbag cushion 112 during expansion and deployment. The bracket 224 is formed longitudinally along the vertical direction of the frame side plate part 116, and provides support to the airbag cushion 112 from outside in the width direction of the seat 102. The bracket 224 extends even in front of the frame side plate part 116 and is capable of widely supporting the airbag cushion 112.

The cover member 226 encloses the airbag cushion 112 together with the bracket 224. The airbag module 222 is also attached to a center side in the width direction of the seatback 104 in the frame side plate part 116.

Figure 7B:
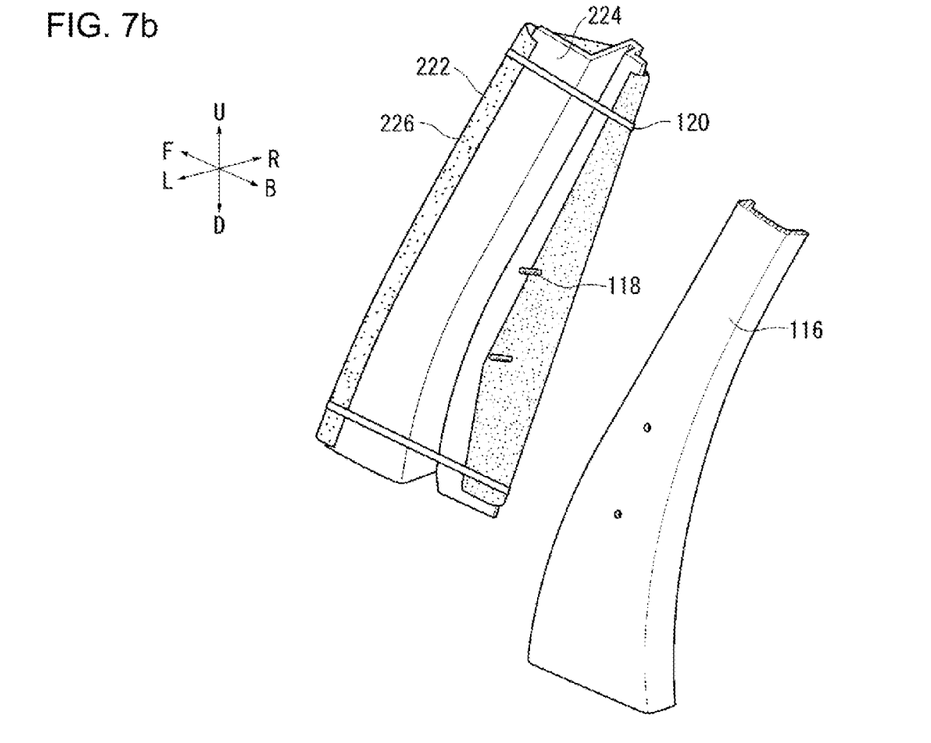

FIG. 7(*b*) is a diagram in which the airbag module 222 in FIG. 7(*a*) is separated from the frame side plate part 116. The stud bolts 118 of the inflator 110 protrude from the airbag module 222. Inflator 110 extends through the airbag cushion 112 (see FIG. 9) and the bracket 224 and is fastened to the frame side plate part 116.

Figure 8:
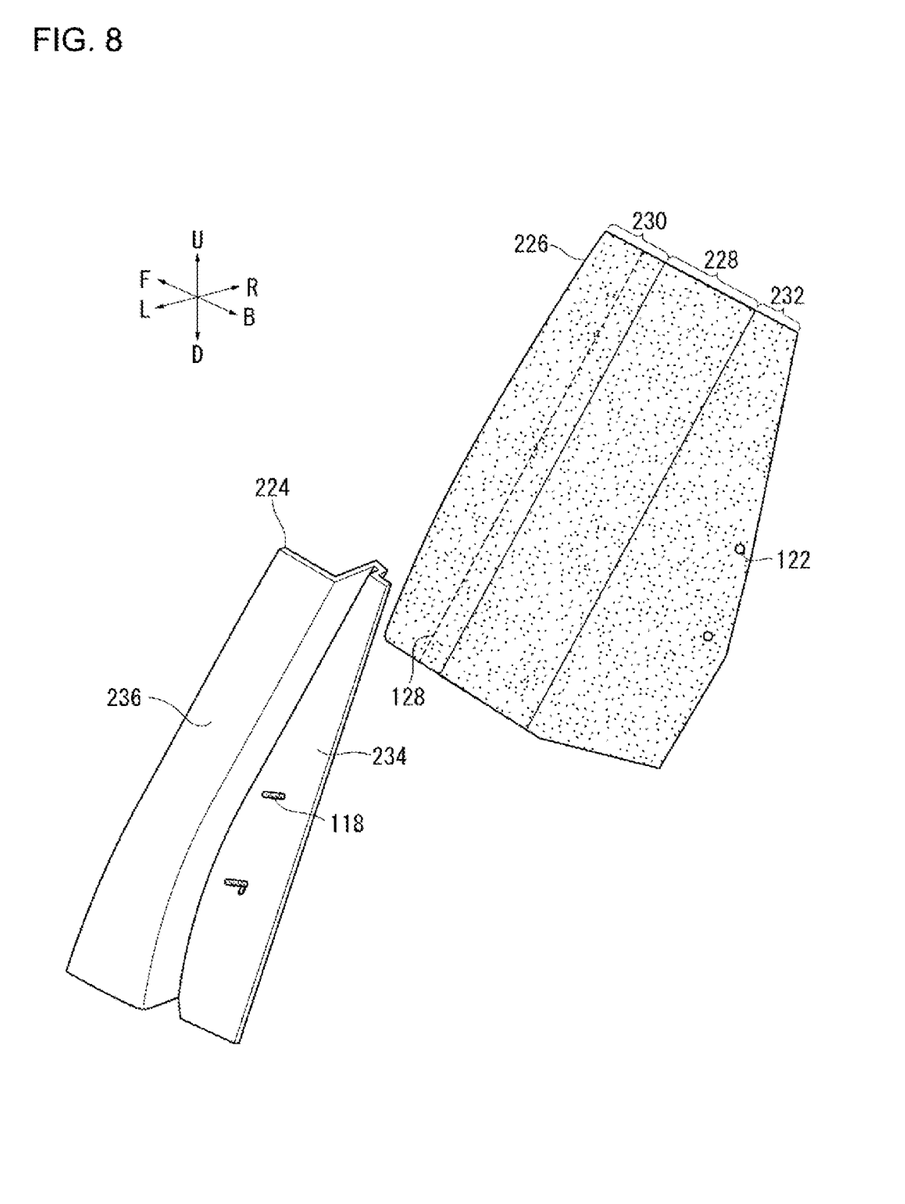
FIG. 8 is a diagram in which the cover member is separated from the bracket in FIG. 7(b).

FIG. 8 is a diagram in which the cover member 226 is separated from the bracket 224 of FIG. 7(*b*). Similarly to the cover member 114 (FIG. 2(*b*)), the cover member 226 is configured from non-woven fabric or the like containing a plurality of polymer fibers and covers the airbag cushion 112 (see FIG. 9) together with the bracket 224 using the stud bolts 118 and the tape 120. The cover member 226 has a hard portion 228, soft portions 230 and 232, and the weak portion 128.

The bracket 224 has a base part 234 to which the inflator 110 (see FIG. 9) and the airbag cushion 112 are secured and a reaction force plate 236, which imparts a reaction when the airbag cushion 112 expands. The base part 234 is formed in a plane along the frame side plate part 116 and the stud bolts 118 pass therethrough. The reaction force plate 236 curves from a front side of the base part 234, extending to an outer side of the vehicle in the vehicle width direction, and further curves and extends toward the front. The presence of the reaction force plate 236 allows the airbag cushion 112 to push against the reaction force plate 236 to expand and deploy efficiently toward the front of the vehicle. Note that the bracket 224 may be formed including not only a resin, but also a metal, or either of these materials, allowing for a configuration having suitable rigidity to be realized.

Figure 9:
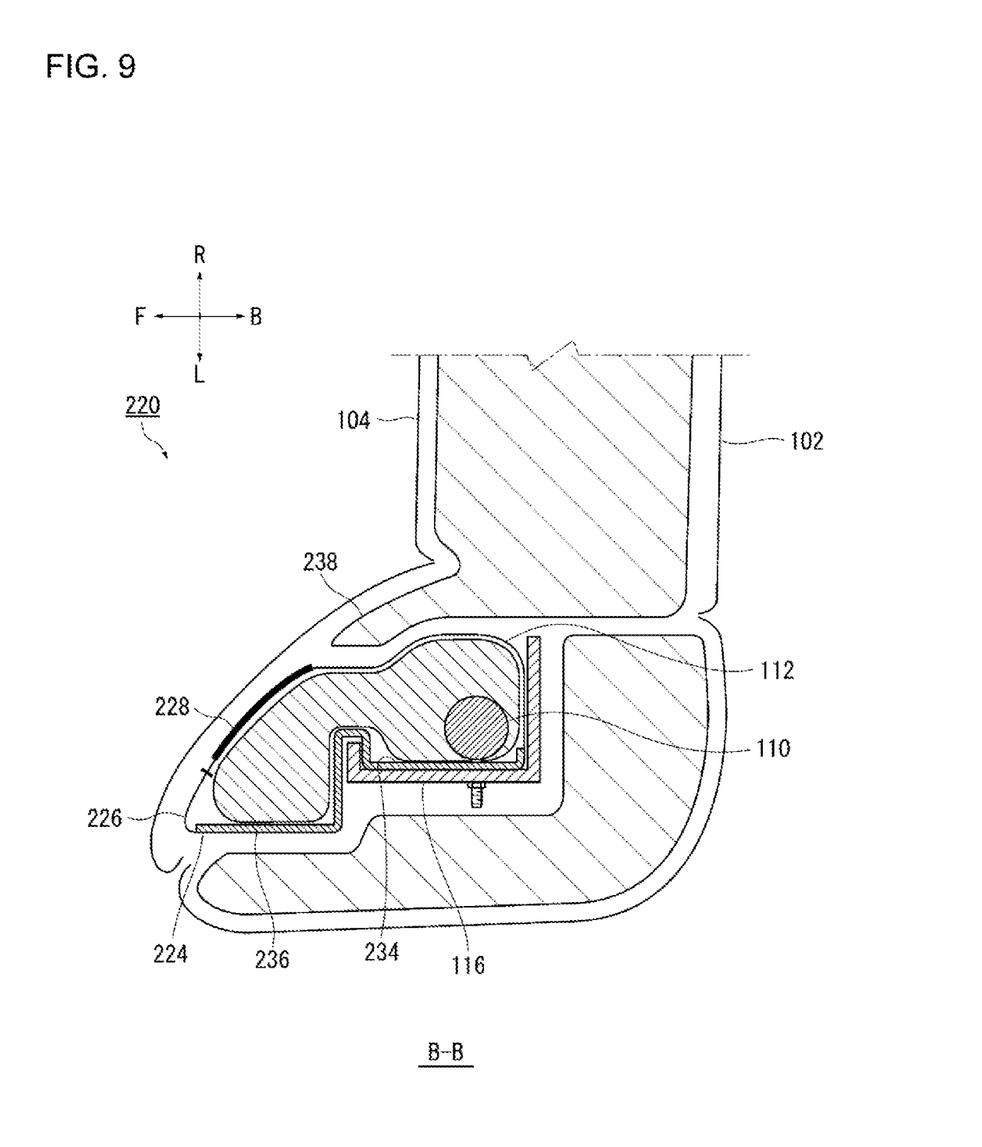
FIG. 9 is a cross-sectional view along B-B of the airbag device prior to activation in FIG. 7(a).

FIG. 9 is a cross-sectional view along B-B of the airbag device 220 prior to activation in FIG. 7(*a*). The weak portion 128 of the cover member 226 is provided so as to be positioned in front of the airbag cushion 112 in a state in which the airbag module 222 is attached to the frame side plate part 116. When the airbag cushion 112 expands and deploys from the frame side plate part 116 toward the front, the weak portion 128 is positioned in front of the airbag cushion 112, which enables the weak portion 128 to break efficiently.

The reaction force plate 236 of the bracket 224 extends from the base part 234 outside of the seatback 104 in the width direction across a front edge of the frame side plate part 116, then further curving and extending toward the front. In this manner, when the occupant comes into contact with the airbag cushion 112, reaction force can be efficiently obtained from the reaction force plate 236 present on the opposite side thereof, enabling suitably absorbing the load of the occupant and more fully restraining the occupant.

The bracket 224 is in a state engaged with the front edge of the frame side plate part 116. This configuration allows the bracket 224 to protect against positional displacement relative to the frame side plate part 116 and support the airbag cushion 112 without the orientation changing during expansion and deployment of the airbag cushion 112. Furthermore, the reaction force plate 236 can efficiently impart a reaction force from the rear and the side relative to an expanded and deployed airbag cushion 112 due to being positioned extending to the front of the vehicle.

In the airbag module 222, the hard portion 228 of the cover member 226 is arranged facing a portion corresponding to an occupant side of the seat 102. According to this configuration, a side airbag device is implemented and the airbag cushion 112 in stowed form can be suitably retained by arranging the hard portion 228 in a portion in which an occupant load is readily captured.

Also, a prescribed seat pad 238 is packed into the seat 102. The hard portion 228 of the cover member 226 is arranged so as to be flush with an occupant side of the seat pad 238. This configuration can prevent a difference in level from arising when the occupant is in contact with the seat 102 and can maintain seating comfort of the seat 102. Note that an area of the hard portion 228 can be appropriately set by an overlap with the seat pad 238.

As described above, according to the present embodiment, the cover member 226 facilitates obtaining a reaction force from the bracket 224 when the airbag cushion 112 restrains the occupant in addition to the ability to maintain the stowed form of the airbag cushion 112. Therefore, occupant restraining performance of the airbag cushion 112 also improves.

Figure 10A:
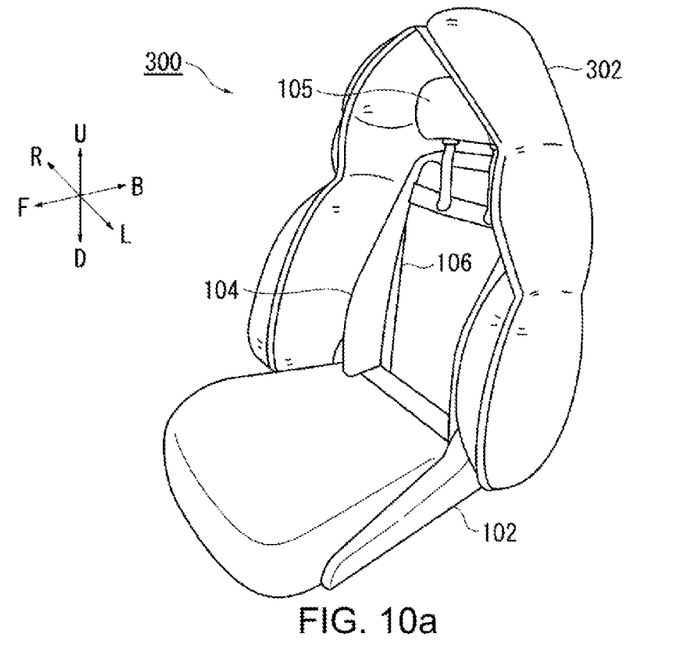

FIG. 10 is a second modified example (airbag device 300) of the airbag device 100 in FIG. 1 and the like. FIG. 10(*a*) illustrates an airbag cushion 302 in an activated state. The airbag device 300 is implemented as a device known as a life cell airbag and is equipped in the seat 102. The airbag cushion 302 achieved as the life cell airbag encloses and protects an area similar to a roof from the head to the waist of the occupant seated in the seat 102.

Figure 10B:
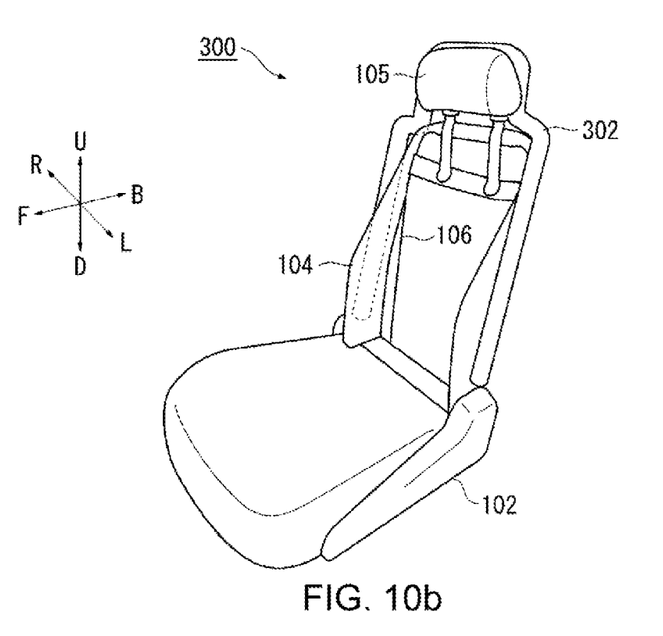

FIG. 10(*b*) is a diagram illustrating the state prior to activation of the airbag cushion 302 of FIG. 10(*a*). The airbag cushion 302 is reduced to a long rod shape by rolling and folding and is equipped in the seat 102 along the seatback 104 and the headrest 105. Even in the present embodiment, a periphery of the airbag cushion 302 in folded form is covered by a cover member 304 (see FIG. 11(a)).

Figure 11A:
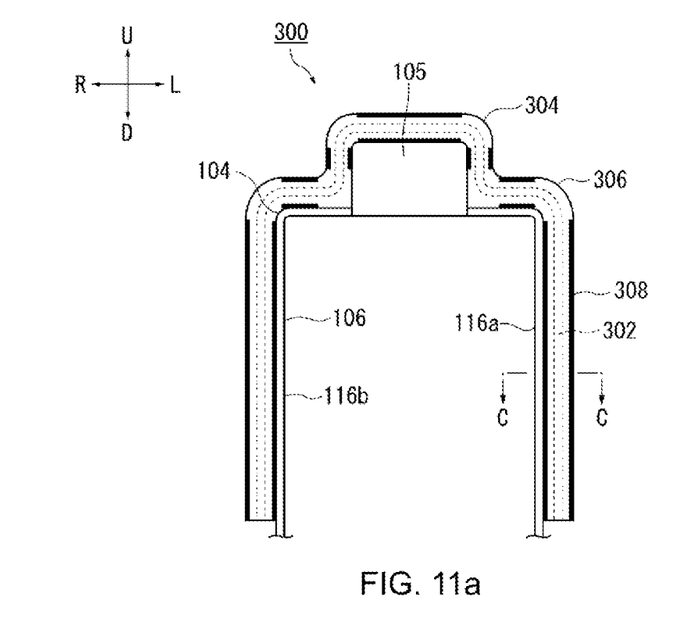
FIG. 11 is a diagram illustrating the cover member enclosing the airbag cushion in stowed form in FIG. 10(b).

FIG. 11 is a diagram illustrating the cover member 304 enclosing the airbag cushion 302 in stowed form in FIG. 10(b). FIG. 11(a) is a diagram illustrating the airbag cushion 302 in FIG. 10(b) viewed from the front of the vehicle. The airbag cushion 302 in stowed form is in a state connected from the frame side plate part 116a positioned on a side portion of one side of the frame 106 of the seatback 104, across an upper portion of the headrest 105, and to a frame side plate part 116b on the other side.

In FIG. 11(a), a hard portion 308 of the cover member 304 is illustrated by a thick line, whereas the position illustrated by the thin line outside the hard portion 308 is the soft portion 306. With the cover member 304, the soft portion 306 is arranged in the airbag cushion 302 in stowed form in a location bent along the shape of the seatback 104 and the headrest 105, and the hard portion 308 is linearly arranged in a different location.

Specifically, the hard portion 308 is provided along a side portion of the frame 106 of the seatback 104, an upper portion of the seatback 104, a side portion of the headrest 105, and an upper portion of the headrest 105. The soft portion 306 is arranged near a boundary of the side portion and an upper portion of the frame 106 of the seatback 104, near a boundary of the headrest 105 and the seatback 104, and near a boundary of the side portion and the upper portion of the headrest 105. With this configuration, bending the cover member 304 via the soft portion 306 allows the airbag cushion 302 to be suitably disposed on an inner portion of the seatback 104 and the headrest 105.

Figure 11B:
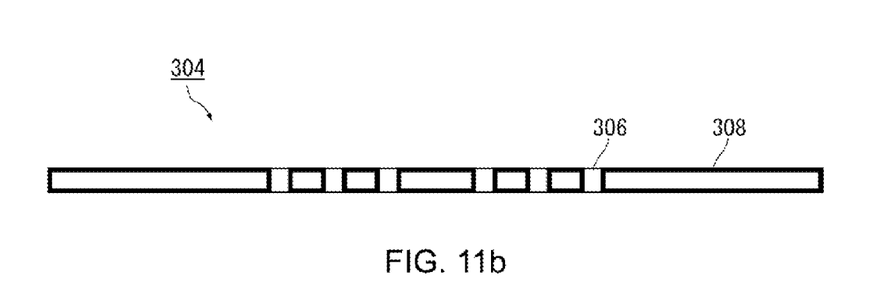

FIG. 11(b) is a diagram of a state in which the cover member 304 in FIG. 11(a) extends in a straight line. As described above, in the cover member 304, a plurality of the soft portions 306 are formed according to locations on the seatback 104 and the headrest 105 corresponding to an angle when viewed from the front of the vehicle, and a plurality of the hard portions 308 are formed according to the positions of the seatback 104 and the headrest 105 corresponding to a side when viewed from the front of the vehicle.

Figure 12:
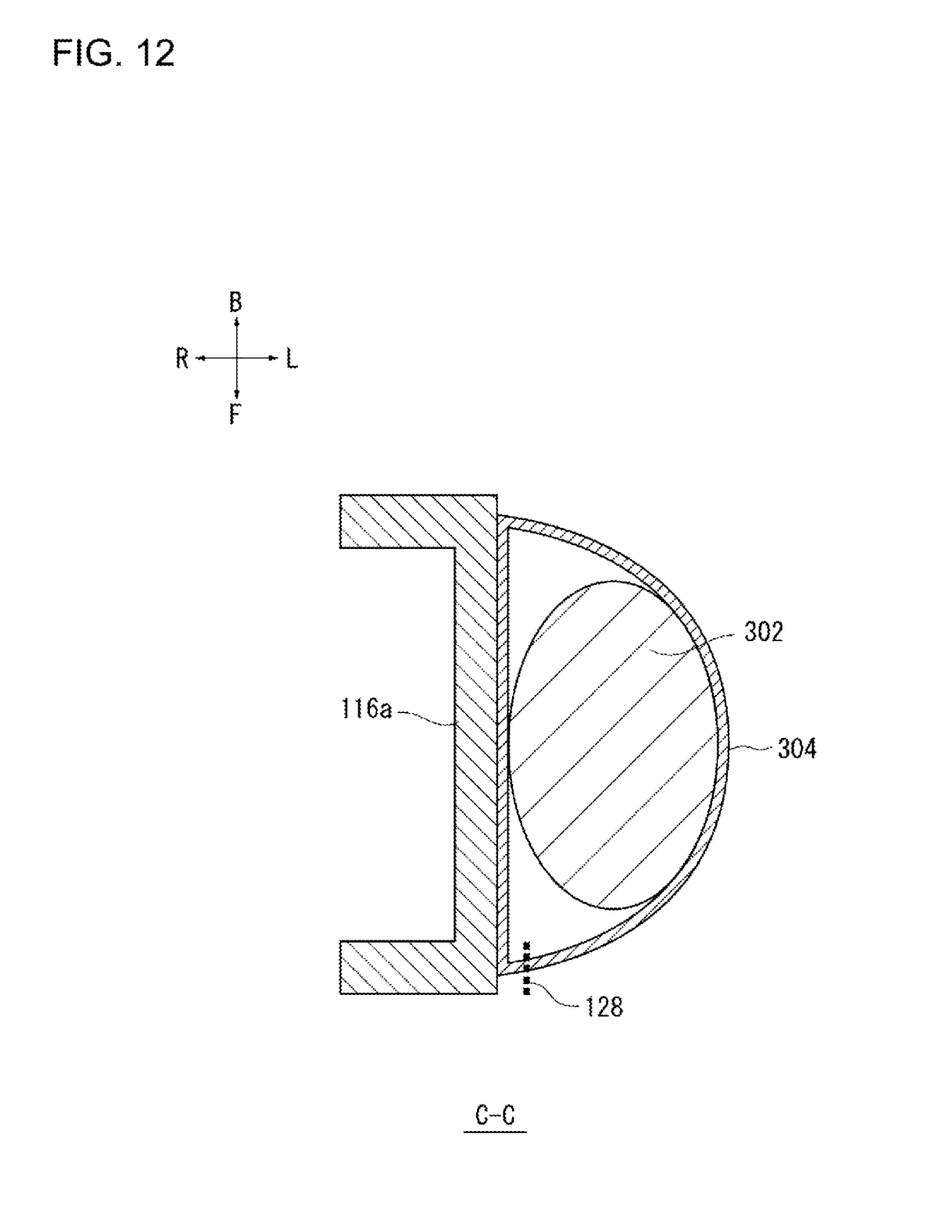
FIG. 12 is a cross-sectional view along C-C of the cover member in FIG. 11(a).

FIG. 12 is a cross-sectional view along C-C of the cover member 304 in FIG. 11(a). The cover member 304 covers the airbag cushion 302 along the frame side plate part 116a and the like. With the cover member 304 as well, the weak portion 128 is formed on the vehicle front side, being a deployment direction of the airbag cushion 302.

With the airbag device 300 as well, the cover member 304 suitably retains the airbag cushion 302 in stowed form prior to activation of the airbag cushion 302 while smoothly releasing the airbag cushion 302 upon activation of the airbag cushion 302.

With the cover member 304 in the configuration described above, rolls or folds thereof can be suitably retained even when the airbag cushion 302 is equipped in the vehicle seat 102 in a complex orientation. Further, by appropriately providing the soft portion 306 in a plurality of locations on the cover member 304, such can be fitted to various types of seat frames. A configuration in which the airbag cushion 302 is retained by the cover member 304 is cost effective over when a dedicated jig for holding the airbag cushion 302 for another bracket, case, or the like is provided.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as an airbag device for restraining occupants during an emergency.

EXPLANATION OF CODES

100. Airbag device, 102. Seat, 104. Seat back, 105. Headrest, 106. Frame, 108. Airbag module, 110. Inflator, 112. Airbag cushion, 114. Cover member, 116. Frame side plate part, 116a. First side frame side plate part, 116b. Second side frame side plate part, 118. Stud bolt, 120. Tape, 122. Bolt hole, 124. Hard portion, 126. Soft portion, 128. Weak portion, 130. Die, 200. Cover member of modified example, 202. Die, 204a, 204b, 204c. Hard portions, 220. Airbag device of first modified example, 222. Airbag module, 224. Bracket, 226. Cover member, 228. Hard portion, 230. Soft portion, 234. Base part, 236. Reaction force plate, 238. Seat pad, 300. Airbag device of second modified example, 302. Airbag cushion, 304. Cover member, 306. Soft portion, 308. Hard portion

The invention claimed is:

1. An airbag device comprising:
   a bag-shaped airbag cushion in a prescribed rolled or folded stowed form; and
   a cover member formed of a ductile cloth material containing a plurality of polymer fibers and that is for covering an outer periphery of the airbag cushion in stowed form;
   wherein the cover member has a hard portion in a state in which at least a portion of the plurality of polymer fibers are melted together, and a soft portion in which a ratio of the plurality of melted polymer fibers is lower than at least the hard portion and that bends more easily than the hard portion,
   wherein the cover member is bent along the soft portion and covers at least a portion of the outer periphery of the airbag cushion in stowed form; and
   wherein the airbag device is equipped in a vehicle seat as a side airbag of a vehicle, and the hard portion is arranged so as to face a portion corresponding to an occupant side of the vehicle seat.

2. The airbag device according to claim 1, wherein a prescribed seat pad is packed into the vehicle seat, and the hard portion is arranged so as to be flush with an occupant side of the seat pad.

3. The airbag device according to claim 2, wherein the soft portion is formed in a prescribed position in the cover member and has a weak portion capable of splitting open from an expansion pressure of the airbag cushion.

4. The airbag device according to claim 3, wherein the weak portion includes a prescribed slit.

5. The airbag device according to claim 2, wherein in the hard portion, the plurality of polymer fibers are in a compressed state.

6. The airbag device according to claim 1, wherein the soft portion is formed in a prescribed position in the cover member and has a weak portion capable of splitting open from an expansion pressure of the airbag cushion.

7. The airbag device according to claim 6, wherein the weak portion includes a prescribed slit.

8. The airbag device according to claim 7, wherein in the hard portion, the plurality of polymer fibers are in a compressed state.

9. The airbag device according to claim 6, wherein in the hard portion, the plurality of polymer fibers are in a compressed state.

10. The airbag device according to claim 1, wherein in the hard portion, the plurality of polymer fibers are in a compressed state.

11. An airbag device comprising:
   a bag-shaped airbag cushion in a prescribed rolled or folded stowed form; and
   a cover member formed of a ductile cloth material containing a plurality of polymer fibers and that is for covering an outer periphery of the airbag cushion in stowed form;
   wherein the cover member has a hard portion in a state in which at least a portion of the plurality of polymer fibers are melted together, and a soft portion in which a ratio of the plurality of melted polymer fibers is lower than at least the hard portion and that bends more easily than the hard portion;
   wherein the cover member is bent along the soft portion and covers at least a portion of the outer periphery of the airbag cushion in stowed form; and
   , wherein the airbag cushion in stowed form is equipped in a vehicle seat in a state connected from a side portion of a first side of a seatback of the vehicle seat across an upper portion of a headrest of the vehicle seat to a side portion of a second side of the seatback and in the cover member, the soft portion is arranged in a position bent in a shape of the seatback and the headrest when the airbag cushion is in a stowed state.

12. The airbag device according to claim 11, wherein the soft portion is arranged at least near a boundary of side portions and an upper portion of the seatback, near a boundary of the headrest and the seatback, and near a boundary of the side portions and the upper portion of the headrest.

13. The airbag device according to claim 12, wherein in the hard portion, the plurality of polymer fibers are in a compressed state.

14. The airbag device according to claim 11, wherein in the hard portion, the plurality of polymer fibers are in a compressed state.

* * * * *